(12) United States Patent  
Ali et al.

(10) Patent No.: US 11,409,878 B2  
(45) Date of Patent: Aug. 9, 2022

(54) TRUSTED SEQUENCE FOR COMPUTING DEVICES VIA HASHES

(71) Applicant: Hewlett-Packard Development Company, L.P., Spring, TX (US)

(72) Inventors: Vali Ali, Spring, TX (US); Richard Bramley, Mansfield, MA (US); Ronaldo Rod Ferreira, Porto Alegre (BR); Endrigo Pinheiro, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/980,884

(22) PCT Filed: May 31, 2018

(86) PCT No.: PCT/US2018/035277  
§ 371 (c)(1),  
(2) Date: Sep. 15, 2020

(87) PCT Pub. No.: WO2019/231445  
PCT Pub. Date: Dec. 5, 2019

(65) Prior Publication Data  
US 2021/0073386 A1   Mar. 11, 2021

(51) Int. Cl.  
*G06F 21/57* (2013.01)  
*G06F 16/22* (2019.01)  
*G06F 9/4401* (2018.01)

(52) U.S. Cl.  
CPC .......... *G06F 21/572* (2013.01); *G06F 9/4401* (2013.01); *G06F 16/2219* (2019.01); *G06F 16/2255* (2019.01); *G06F 21/575* (2013.01)

(58) Field of Classification Search  
CPC ............... G06F 21/572; G06F 16/2255; G06F 16/2219; G06F 9/4401; G06F 21/575  
See application file for complete search history.

(56) References Cited

U.S. PATENT DOCUMENTS

| 7,484,099 B2 | 1/2009 | Bade et al. |
| 7,711,960 B2 | 5/2010 | Scarlata |
| 2007/0300207 A1* | 12/2007 | Booth .................. G06F 21/575 717/124 |
| 2008/0126779 A1 | 5/2008 | Smith |
| 2008/0263345 A1* | 10/2008 | Booth .................. G06F 21/572 713/2 |
| 2009/0070598 A1 | 3/2009 | Cromer et al. |

(Continued)

FOREIGN PATENT DOCUMENTS

EP         2798559         11/2014

*Primary Examiner* — Danny Chan  
(74) *Attorney, Agent, or Firm* — Rahman LLC (57) ABSTRACT

An example computer system includes a memory having a computer program, a set of data containing a cryptographic first hash protected by a code, and a set of trusted security guidelines for operating an electronic device; a trusted platform module device to store a second hash associated with the computer program; a trusted application computing agent to establish that a hardware initialization sequence of the electronic device is trusted upon matching the first hash with the second hash; and a controller to operate the computer program on the electronic device according to the set of trusted security guidelines.

17 Claims, 10 Drawing Sheets

(56) References Cited

U.S. PATENT DOCUMENTS

| | | |
|---|---|---|
| 2009/0132829 A1 | 5/2009 | Ohhashi |
| 2010/0088499 A1 | 4/2010 | Zimmer et al. |
| 2010/0306076 A1* | 12/2010 | Taveau .............. G06Q 20/3229 705/26.8 |
| 2013/0046993 A1 | 2/2013 | Jueneman et al. |
| 2014/0380425 A1 | 12/2014 | Lockett et al. |

* cited by examiner

TRUSTED SEQUENCE FOR COMPUTING DEVICES VIA HASHES

BACKGROUND

Computing devices run various types of software requiring computer system resources for proper functioning. Software may contain viruses and other malicious code that may disrupt the proper functioning of the computer device. Computers use different techniques to scan software to ensure malicious threats are not processed by the computer.

BRIEF DESCRIPTION OF THE DRAWINGS

The following detailed description references the drawings, in which.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Hardware or firmware boot sequences are used by several security applications to assist in establishing trust of applications to be run on a computer. However, in some operating systems any access to the boot sequences is made with a built-in operating system mechanism; e.g., operating system interface calls, which may be prone to malicious attacks. For example, malicious software may be accessing and intercepting those calls in a process called API hooking before a trusted software application retrieves the data from the boot sequence operating system. If the malicious code successfully hooks the calls to the operating system, the trusted application might eventually receive data that is invalid or untrustworthy. In an example, the software agent running on the Microsoft Windows® operating system reads a configuration file called manifest from the basic input/output system (BIOS), which contains the BIOS-enforced security policies that must be observed for a system to be considered compliant to a set of established information technology policies. If the manifest file is hooked when the software agent retrieves it, some configuration policies might be maliciously disabled, putting the entire system at risk.

In order to address this, the examples described below provide a technique to ensure that persisted data received from a hardware initialization sequence executed by a computing device is genuine; i.e., that the processor calls made to the operating system to retrieve that data does not contain malicious software or is otherwise modified as part of a nefarious attack on the computing device. The examples described below may work for BIOS as well as Unified Extensible Firmware Interface (UEFI) initialization sequences. The persisted data can be a set of hardware initialization-enforced security policies that must be enforced by a trusted application run by the operating system of the computing device. Whenever the data is persisted on the operating system, a cryptographic hash of the data may be stored in an auxiliary trusted platform module hardware chip. When that persisted data must be retrieved from the operating system, the processor calculates the cryptographic hash of that data and compares it with the hash previously stored on the trusted platform module. If there is a mismatch, the trusted application can discard the retrieved data and take action; if the hashes match, the trusted application can securely consume the data it received from the operating system.

Figure 1:
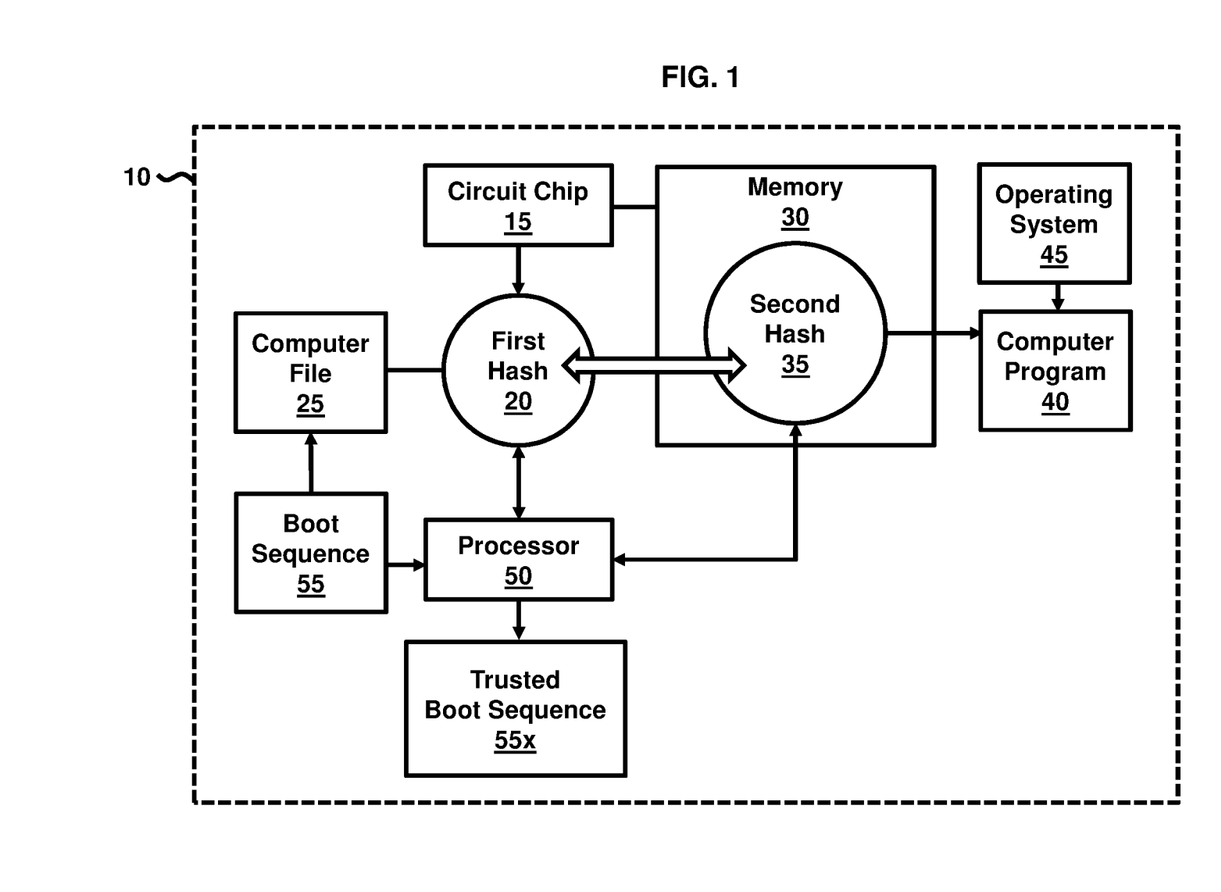
FIG. 1 is a block diagram illustrating a computing device using a password protected hash to execute a trusted firmware boot sequence, according to an example.

FIG. 1 illustrates a computing device 10 comprising a circuit chip 15 to compute a password protected first hash 20 for a computer file 25. In examples, the computing device 10 may be a personal computer, laptop computer, tablet, smartphone, server, or any other type of electronic device capable of processing or receiving instructions for running a computer operating system and downloadable software applications. The circuit chip 15 may be an integrated circuit chip, microcontroller, or other type of electronic module containing electronic circuits to perform various logic functions. In an example, the circuit chip 15 may be a trusted platform module to provide secure cryptoprocessing capabilities.

For example, the various modules described herein and/or illustrated in the figures may be embodied as hardware-enabled modules and may be configured as a plurality of overlapping or independent electronic circuits, devices, and discrete elements packaged onto a circuit board to provide data and signal processing functionality within a computer.

An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object-oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

According to an example, the first hash 20 is the result of a computer-implemented hash function that may be used to map data; e.g., mapping data of arbitrary sizes to fixed sizes. The hash function creates the first hash 20 in the form of a data value(s). In an example, the first hash 20 comprises a cryptographic hash function that is provided to uniquely identify data without using the same hash value. Moreover, in order to provide for the uniqueness in identifying data, the first hash 20 is password protected. According to some examples, the computer file 25 may be any suitable computer resource mechanism to store or record data in the memory 30 of the computing device 10.

The memory 30 is coupled to the circuit chip 15 to store a second hash 35 associated with a computer program 40 executed by an operating system 45 of the computing device 10. In some examples, the memory 30 may be non-volatile memory of the computing device 10 including flash memory, read-only memory (ROM), programmable read-only memory (PROM), erasable programmable read-only memory (EPROM), or electrically erasable programmable read-only memory (EEPROM). According to an example, the second hash 35 is also the result of a computer-implemented hash function that may be used to map data; e.g., mapping data of arbitrary sizes to fixed sizes. The hash function creates the second hash 35 in the form of a data value(s). In an example, the second hash 35 comprises a cryptographic hash function that is provided to uniquely identify data without using the same hash value. The second hash 35 is created independently from the first hash 20 and may be stored in separate locations on the computing device 10. The second hash 35 is not necessarily password protected, but may contain some indicia of cryptographic functionality, according to an example. Furthermore, the second hash 35 may be created prior to the first hash 20 based on a set of established security guidelines that are required to be followed for any computer file 25 to be processed by the computing device 10. The computer program 40 may be any type of software application containing a set of computer-implemented instructions executable by the computing device 10. The computer program 40 may be written in any suitable form of programming language and may be downloaded onto the computing device 10 or may be remotely downloaded from a server device/location through networked communication, access, and retrieval, in accordance with some examples.

The computing device 10 further includes a processor 50 to retrieve the password protected first hash 20 when the computer file 25 is to be executed by the processor 50 during a firmware boot sequence 55. In some examples, the processor 50 may comprise a central processing unit (CPU) of the computing device 10. In other examples, the processor 50 may be a discrete component independent of other processing components in the computing device 10. According to another example, the processor 50 may be communicatively linked to the circuit chip 15 or may be a partitioned component of the circuit chip 15. The firmware boot sequence 55 may refer to a BIOS or UEFI firmware boot sequence 55 to perform hardware initialization of the computing device 10. In an example, the processor 50 retrieves the first hash 20 from a storage device on the computing device 10 or may retrieve the first hash 20 from a remote networked location; e.g., a remote server, etc. In other examples, the first hash 20 may be retrieved from memory 30.

The processor 50 is provided to compare the first hash 20 with the second hash 35 to establish a trusted firmware boot sequence 55x for execution by the computing device 10. The comparison of the first hash 20 with the second hash 35 performed by the processor 50 may involve comparing the hash values of each of the first hash 20 and the second hash 35 to determine whether there is a match between the respective hash values, in an example. According to another example, the processor 50 may compare the first hash 20 with the second hash 35 by comparing the respective passwords of the first hash 20 and the second hash 35, in examples where the second hash 35 is password protected. The trusted firmware boot sequence 55x may be the same as the firmware boot sequence 55 once the processor 50 compares the first hash 20 with the second hash 35 and determines there is a match, and thus the firmware boot sequence 55 may be trusted by the computing device 10. For ease of description and illustration, the trusted firmware boot sequence 55x is shown in FIG. 1 as a separate component from the firmware boot sequence 55. However, as described above it is the same as the firmware boot sequence 55 except it is designated as being trusted upon the matching of the first hash 20 with the second hash 35. Accordingly, the first hash 20 is associated with the computer file 25 to be executed by the processor 50 of the computing device 10 during a firmware boot sequence 55, and the second hash 35 is associated with the computer program 40 executed by an operating system 45 of the computing device 10. By comparing and matching the first hash 20 with the second hash 35, it is determined that the firmware boot sequence 55 is a trusted firmware boot sequence 55x and, as such, there are no malicious codes or other types of malware associated with the computer file 25.

Figure 2:
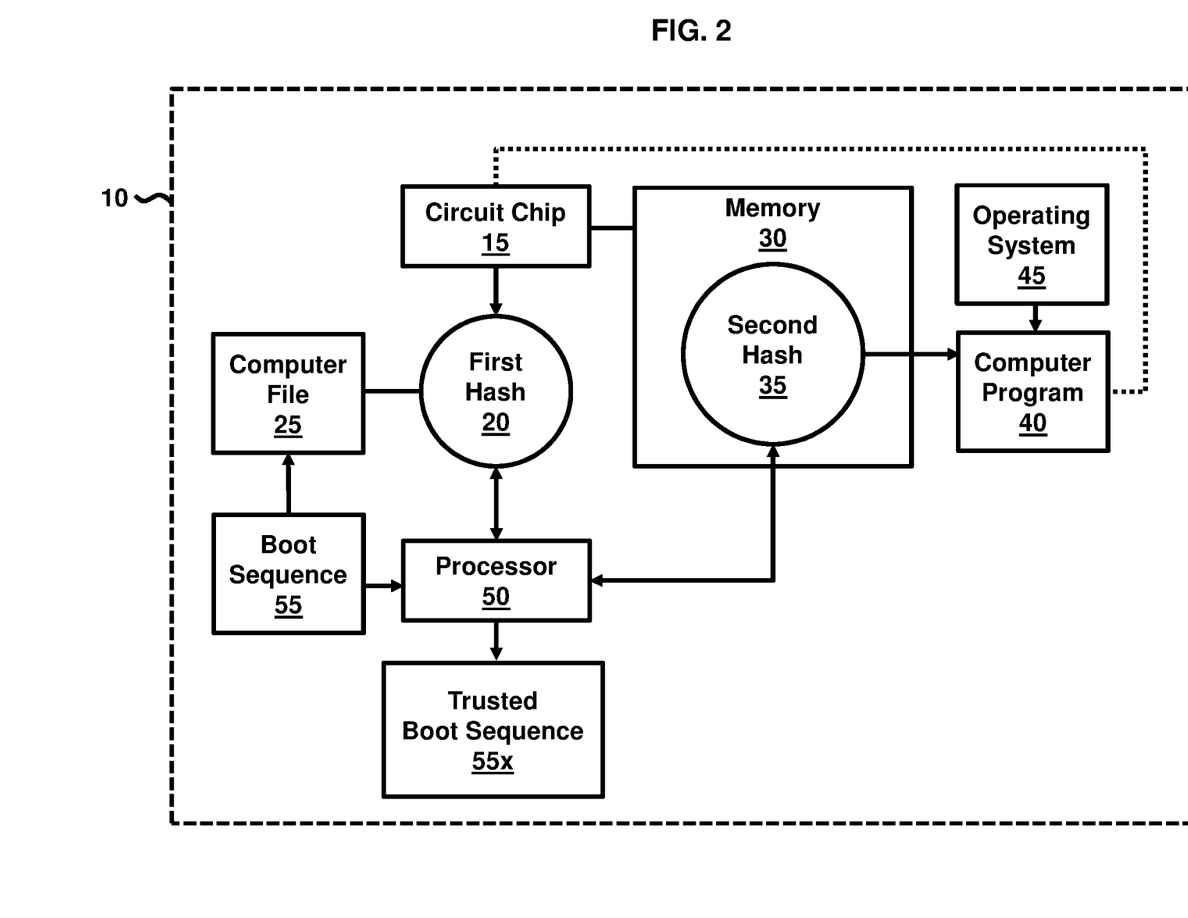
FIG. 2 is a block diagram illustrating the computing device of FIG. 1 with the circuit chip being communicatively linked to the computer program, according to an example.

FIG. 2, with reference to FIG. 1, illustrates that the circuit chip 15 may be communicatively linked to the computer program 40. In this regard, the computer program 40 may contain computer-implemented instructions that are executed by the circuit chip 15, according to an example. Moreover, the communicative linking of the circuit chip 15 with the computer program 40 may be established by the protocols set by the computing device 10.

Figure 3:
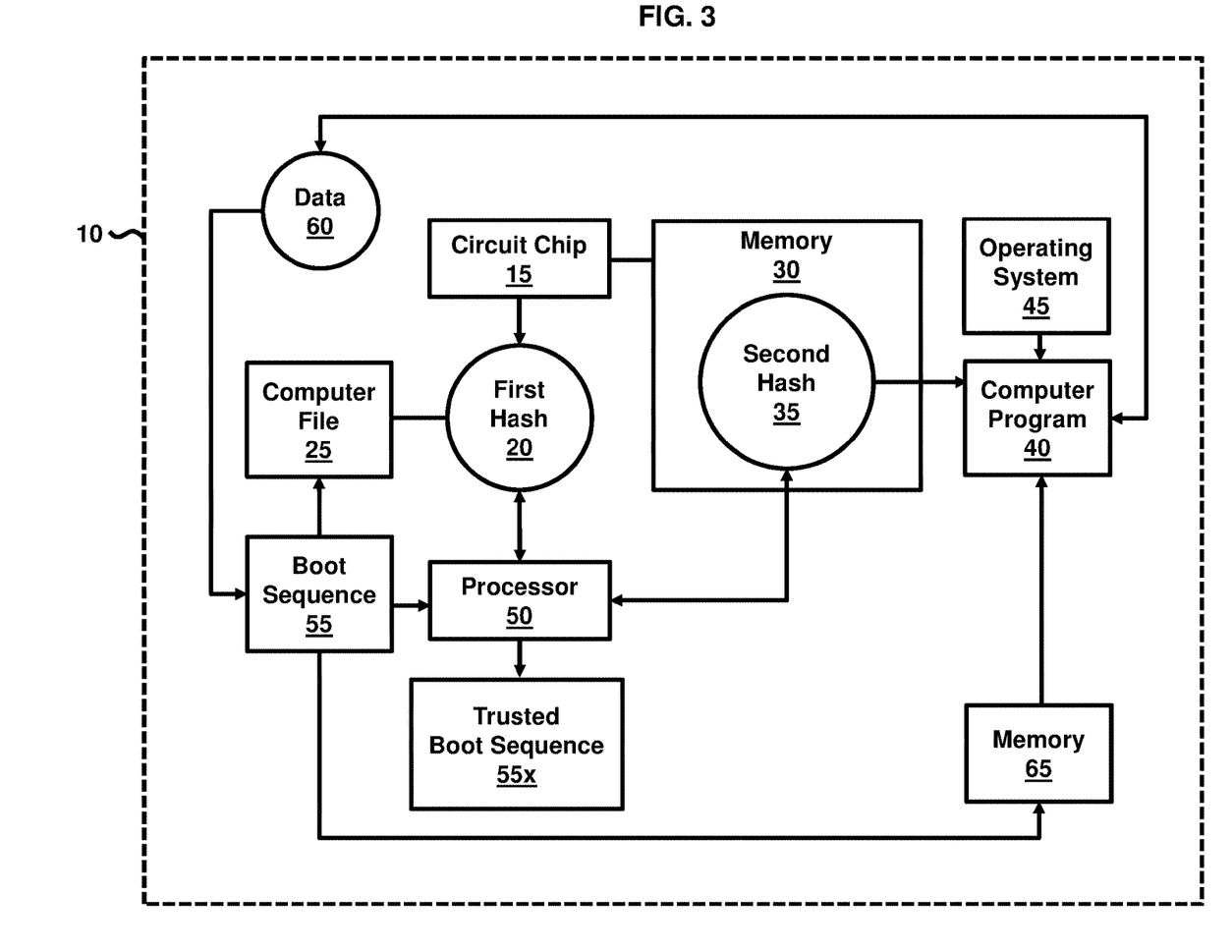
FIG. 3 is a block diagram illustrating the computing device of FIG. 1 with the firmware boot sequence receiving firmware boot sequence-enforced security policy data from the computer program, according to an example.

FIG. 3, with reference to FIGS. 1 and 2, illustrates that the firmware boot sequence 55 may receive firmware boot sequence-enforced security policy data 60 from the computer program 40 for storage in a firmware-protected memory 65 and retrieval by the computer program 40 from the firmware-protected memory 65 on demand. Here, the firmware boot sequence-enforced security policy data 60 may be pre-programmed and stored in the firmware-protected memory 65 for access by the computer program 40 or may be provided to the computer program 40 in a real-time download sequence provided by a network connected server device, etc., according to various examples. During the firmware boot sequence 55 performed by the computing device 10, the computer program 40 may send the firmware boot sequence-enforced security policy data 60 to the processor 50 as part of the firmware boot sequence 55. The firmware-protected memory 65 may be a non-volatile memory component of the computing device 10 that is discrete from memory 30, in an example. Accordingly, the firmware boot sequence-enforced security policy data 60 may be stored in the firmware-protected memory 65 such that the computer program 40 is able to retrieve the firmware boot sequence-enforced security policy data 60 as necessary, on demand.

Figure 4:
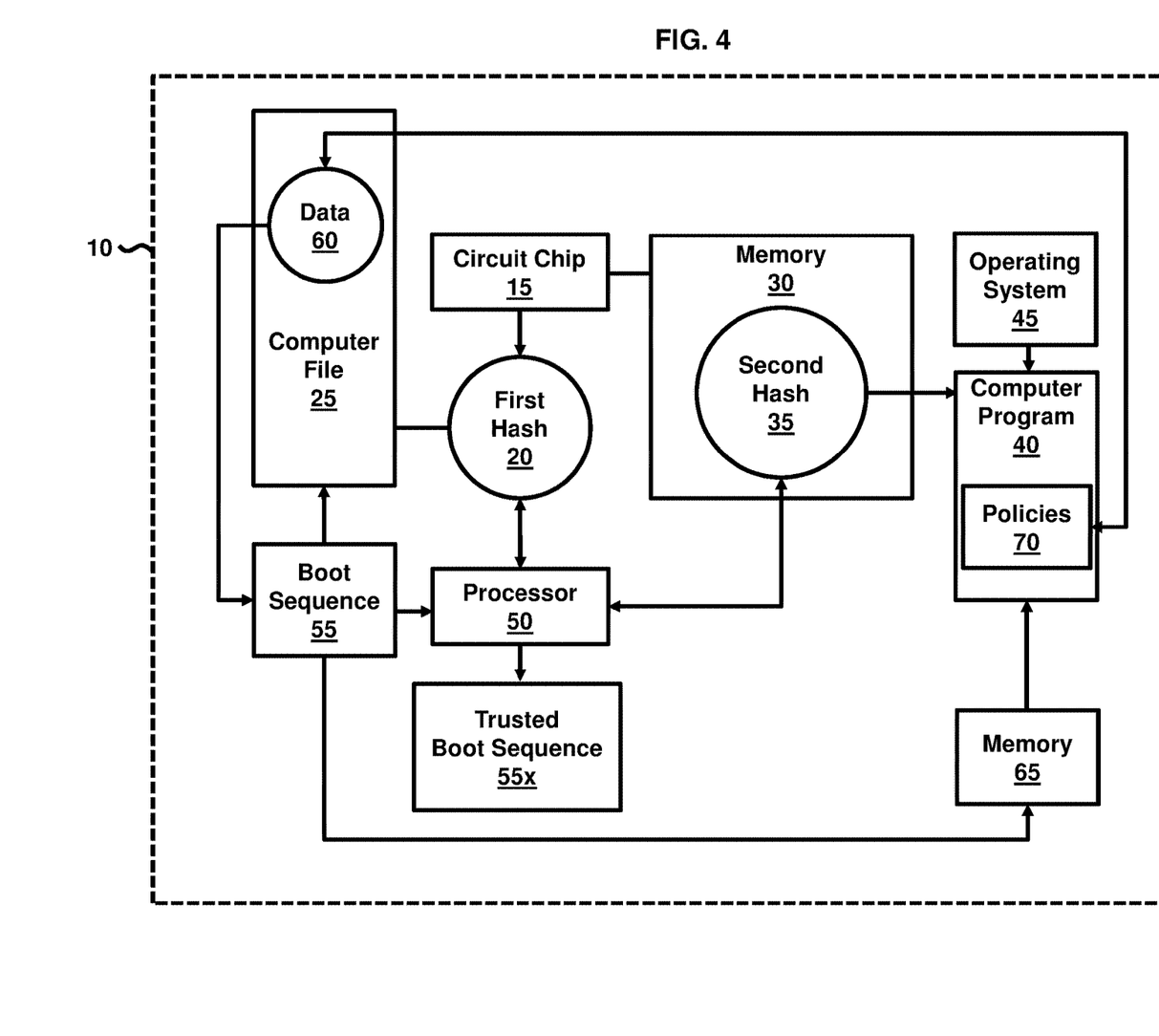
FIG. 4 is a block diagram illustrating the computing device of FIG. 1 showing enforcement of security policies provided by the firmware boot sequence-enforced security policy data, according to an example.

FIG. 4, with reference to FIGS. 1 through 3, is a block diagram illustrating that the computer file 25 may comprise the firmware boot sequence-enforced security policy data 60, and the computer program 40 may enforce security policies 70 provided by the firmware boot sequence-enforced security policy data 60. In an example, the security policies 70 may contain software security protocols established to help keep the computing device 10 operating in a safe and stable manner. For example, the security policies 70 may relate to anti-virus protocols to protect against known malware that could encroach the computing device 10 by way of the computer file 25 and/or computer program 40, among other sources. The security policies 70 may be programmed into the firmware boot sequence-enforced security policy data 60, or the security policies 70 may be provided in a real-time download from a networked server device, etc. In the example of FIG. 4, the firmware boot sequence-enforced security policy data 60 containing the security policies 70 are provided in the computer file 25.

Figure 5:
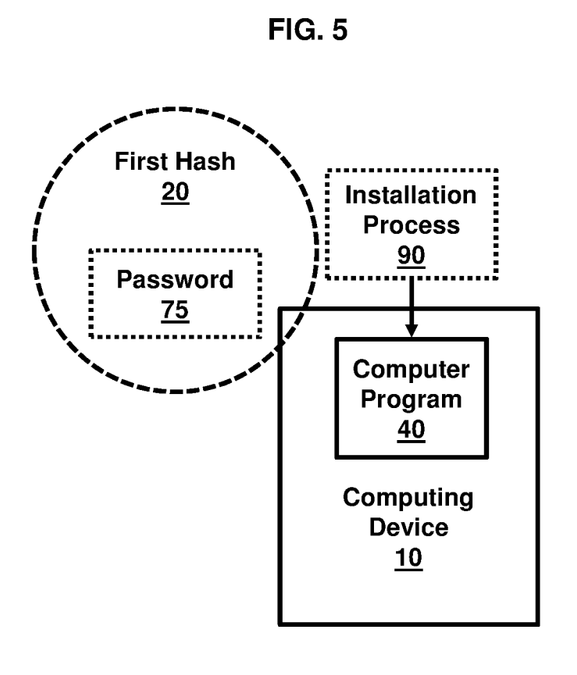
FIG. 5 is a block diagram illustrating generation of the password of the first hash in the computing device of FIG. 1 during a computer program installation process, according to an example.

As shown in FIG. 5, with reference to FIGS. 1 through 4, the password 75 of the first hash 20 may be randomly generated during an installation process 90 of the computer program 40 onto the computing device 10. According to some examples, the password 75 may contain a code, alphanumeric and/or symbol string of characters, a digital image, or any other type of suitable password 75. In accordance with an example, the computer program 40 may randomly generate the password 75 for the first hash 20 during an installation process 90 of the computer program 40 onto the computing device 10, and as such, during different installation processes 90 of the computer program 40, a separate password 75 may be randomly generated for each such instance.

Figure 6:
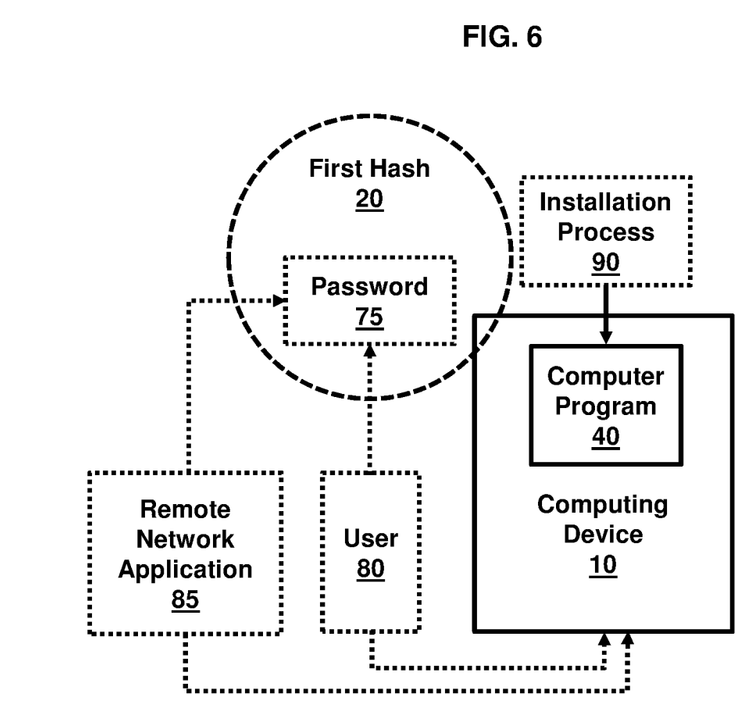
FIG. 6 is a block diagram illustrating providing the password of the first hash in the computing device of FIG. 1 by a user or a remote network application, according to an example.

FIG. 6, with reference to FIGS. 1 through 5, illustrates that the password 75 of the first hash 20 may be provided by any of a user 80 and a remote network application 85 during an installation process 90 of the computer program 40 onto the computing device 10. According to another example, rather than the computer program 40 randomly generating the password 75 as described above with respect to FIG. 5, in the example of FIG. 6 a user 80 may generate the password 75 through user input of the password 75 to the computing device 10 via a user interface; e.g., touch screen, keyboard, mouse, input stylus, eye scanner, finger print sensor, or any other input user interface mechanism. Additionally, in another example, a remote network application 85 may provide the password 75. In this regard, the remote network application 85 may be a software program provided on a remotely-located server, etc. that is communicatively coupled to the computing device.

Figure 7:
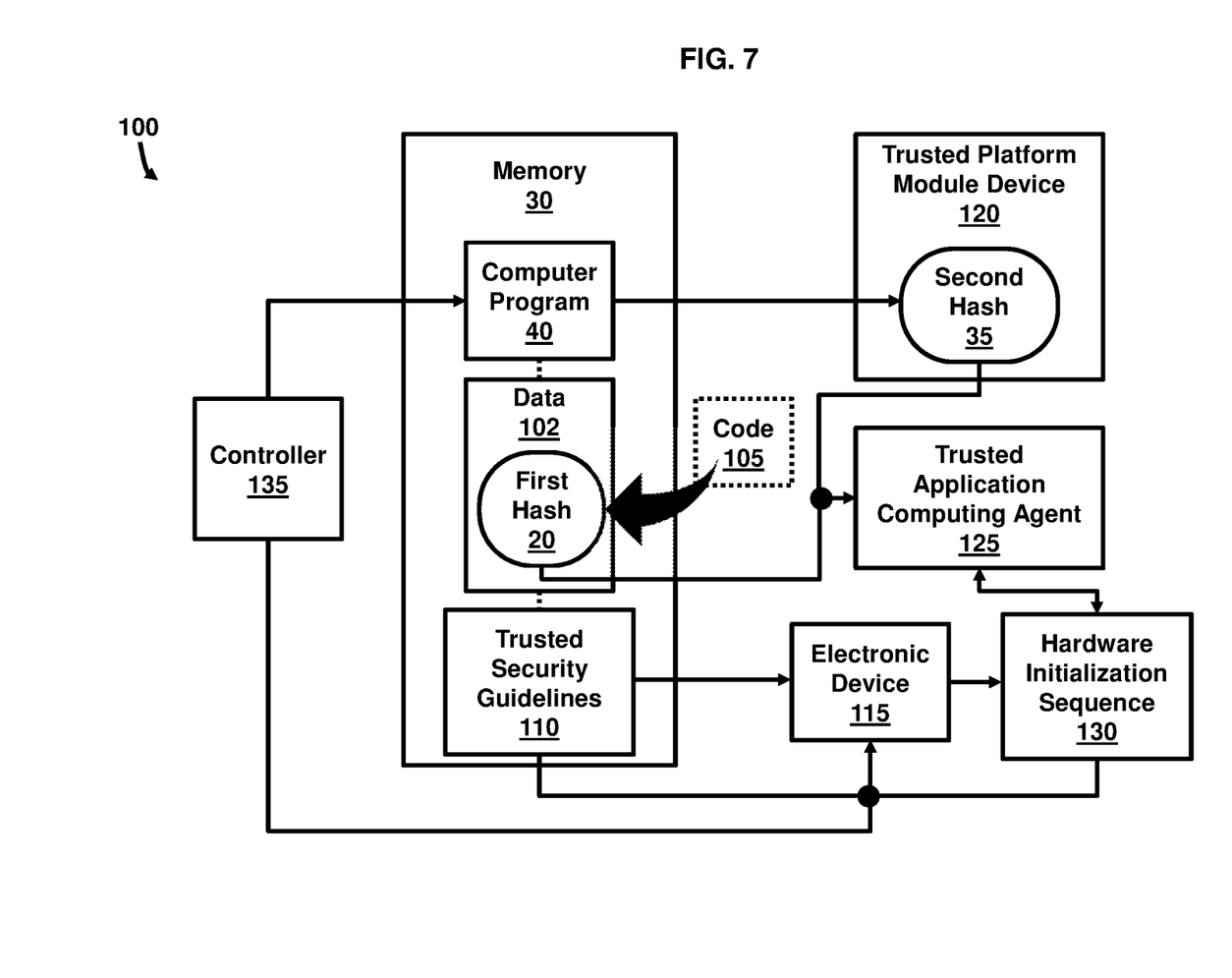
FIG. 7 is a block diagram illustrating a computer system to establish trusted security guidelines for use during a hardware initialization sequence of an electronic device, according to an example.

FIG. 7, with reference to FIGS. 1 through 6, illustrates an example of a computer system 100 comprising a memory 30 comprising a computer program 40, a set of data 102 containing a cryptographic first hash 20 protected by a code 105, and a set of trusted security guidelines 110 for operating an electronic device 115. As described above, the memory 30 may be non-volatile memory of the computing device 10 including flash memory, ROM, PROM, EPROM, or EEPROM, and the computer program 40 may be any type of software application containing a set of computer-implemented instructions executable by the computing device 10. The computer program 40 may be written in any suitable form of programming language and may be downloaded onto the computing device 10 or may be remotely downloaded from a server device/location through networked communication, access, and retrieval, in accordance with some examples.

The set of data 102 containing the cryptographic first hash 20 is the result of a computer-implemented hash function that may be used to map data; e.g., mapping data of arbitrary sizes to fixed sizes. The hash function creates the cryptographic first hash 20 in the form of a data value(s). The set of data 102 may be any suitable form of data 102 that is capable of being stored in memory 30 and containing the cryptographic first hash 20. Moreover, in order to provide for the uniqueness in identifying data, the cryptographic first hash 20 is password protected using the code 105. According to some examples, the code 105 may contain an alphanumeric and/or symbol string of characters, a digital image, or any other type of suitable code 105. In some examples, the set of trusted security guidelines 110 may be analogous to the security policies 70 as described above with respect to FIG. 4. For example, the set of trusted security guidelines 110 may contain software security protocols established to help keep an electronic device 115 operating in a safe and stable manner. For example, the set of trusted security guidelines 110 may relate to anti-virus protocols to protect against known malware that could encroach the electronic device 115 by way of the set of data 102 and/or computer program 40, among other sources. The set of trusted security guidelines 110 may be programmed into the set of data 102 or linked to the set of data 102, or the set of trusted security guidelines 110 may be provided in a real-time download from a networked server device, etc. In some examples, the electronic device 115 may be a personal computer, laptop computer, tablet, smartphone, server, or any other type of electronic device capable of processing or receiving instructions for running a computer operating system and downloadable software applications.

The computer system 100 further includes a trusted platform module device 120 to store a cryptographic second hash 35 associated with the computer program 40. In some examples, the trusted platform module device 120 may be an integrated circuit chip, microcontroller, or other type of electronic module containing electronic circuits to perform various logic functions and to provide secure cryptoprocessing functions. According to an example, the cryptographic second hash 35 is also the result of a computer-implemented hash function that may be used to map data; e.g., mapping data of arbitrary sizes to fixed sizes. The hash function creates the cryptographic second hash 35 in the form of a data value(s). The cryptographic second hash 35 is created independently from the cryptographic first hash 20 and may be stored in separate locations in the computer system 100. The cryptographic second hash 35 is not necessarily password protected, but may contain some indicia of cryptographic functionality, according to an example. Furthermore, the cryptographic second hash 35 may be created prior to the cryptographic first hash 20 based on a set of trusted security guidelines 110 that are required to be followed for the set of data 102 to be processed by the electronic device 115, according to an example.

The computer system 100 also includes a trusted application computing agent 125 to establish that a hardware initialization sequence 130 of the electronic device 115 is trusted upon matching the first hash 20 with the second hash 35. In an example, the trusted application computing agent 125 may comprise a software agent accessible by the electronic device 115 during a hardware initialization sequence 130, where the trusted application computing agent 125 may generate the code 105 for the cryptographic first hash 20. For example, the trusted application computing agent 125 running on the Microsoft Windows® operating system may read a configuration file called manifest from the BIOS or UEFI, which contains the BIOS/UEFI-enforced security policies that must be observed for the electronic device 115 to be considered compliant to a set of trusted security guidelines 110. Moreover, hardware initialization sequence 130 may be analogous to the BIOS or UEFI firmware boot sequence 55 as described above with respect to FIG. 1, to perform hardware initialization of the electronic device 115. Accordingly, the cryptographic first hash 20 is associated with the set of data 102 stored in the memory 30 and to be processed in the electronic device 115 during a hardware initialization sequence 130 initiated by the trusted application computing agent 125, and the cryptographic second hash 35 is associated with the computer program 40 and is stored in the trusted platform module device 120. By comparing and matching the cryptographic first hash 20 with the cryptographic second hash 35, it is determined that the hardware initialization sequence 130 is a trusted hardware initialization sequence 130 and, as such, there are no malicious codes or other types of malware associated with the set of data 102.

The computer system 100 further comprises a controller 135 to operate the computer program 40 on the electronic device 115 according to the set of trusted security guidelines 110. In examples, the controller 135 may be a central processing unit, microprocessor, controller, hardware engine, hardware pipeline, and/or other hardware-enabled device suitable for receiving, processing, and operating the computer program 40.

Figure 8:
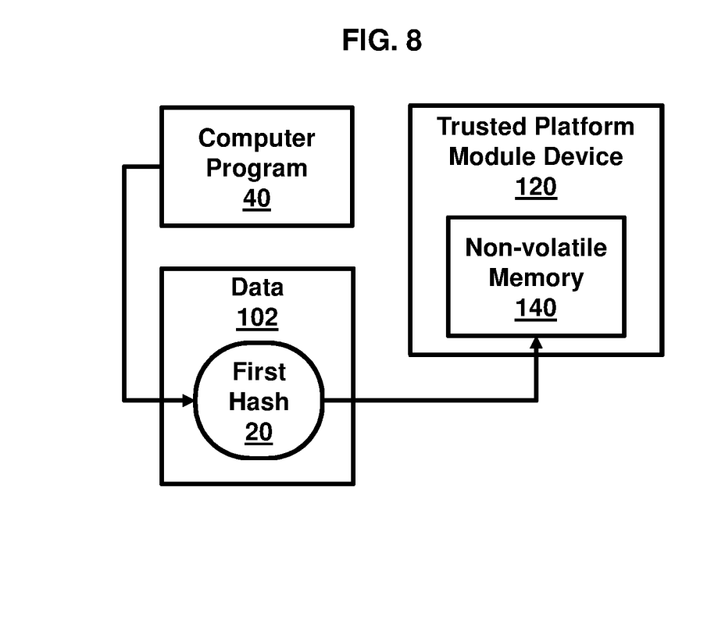
FIG. 8 is a block diagram illustrating storage of a cryptographic hash in a non-volatile memory in the computer system of FIG. 7, according to an example.

FIG. 8, with reference to FIGS. 1 through 7, illustrates that the trusted platform module device 120 may comprise a non-volatile memory 140, and the computer program 40 may store the cryptographic first hash 20 for the set of data 102 in the non-volatile memory 140. The non-volatile memory 140 of the trusted platform module device 120 is separate and discrete from the memory 30 of the overall computer system 100. As such, the non-volatile memory 140 is associated only with the trusted platform module device 120, according to the example shown in FIG. 8.

Figure 9:
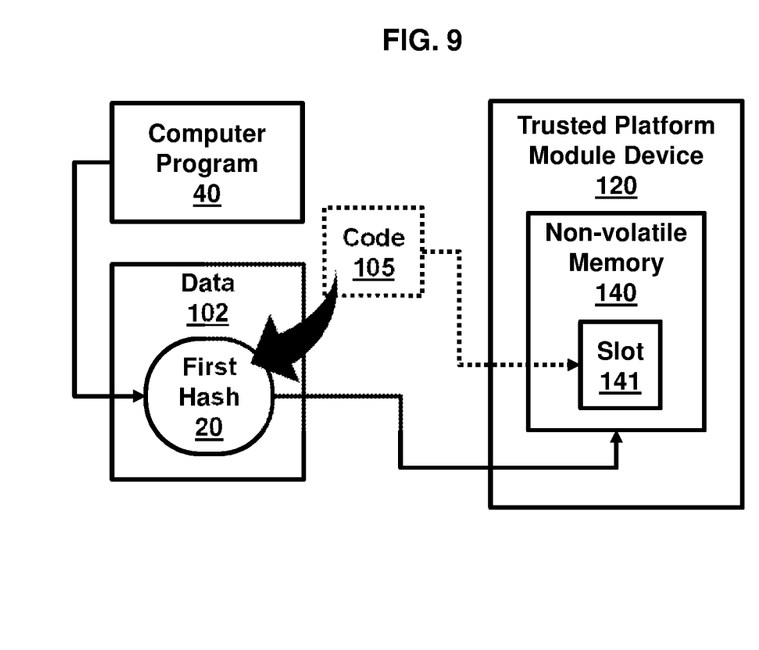
FIG. 9 is a block diagram illustrating use of the code in the computer system of FIG. 7, according to an example.

As shown in the block diagram of FIG. 9, with reference to FIGS. 1 through 8, the code 105 may protect a programmable storage slot 141 in the non-volatile memory 140. In this regard, the trusted platform module device 120 permits defining of read and write credentials to a particular programmable storage slot 141 on the non-volatile memory 140. As such, the code 105 may protect the read and write credentials associated with the programmable storage slot 141.

Figure 10:
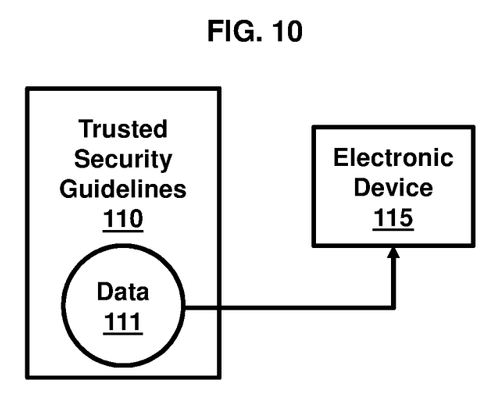
FIG. 10 is a block diagram illustrating hardware-initialization aspects of the set of trusted security guidelines of the computer system of FIG. 7, according to an example.

In the block diagram of FIG. 10, with reference to FIGS. 1 through 9, the set of trusted security guidelines 110 may comprise hardware initialization-enforced security policy data 111 associated with the operational security of the electronic device 115. In an example, the hardware initialization-enforced security policy data 111, which may be analogous to the firmware boot sequence-enforced security policy data 60 described above with respect to FIGS. 3 and 4, may be pre-programmed and stored in the non-volatile memory 140 for access by the computer program 40. Additionally, the hardware initialization-enforced security policy data 111 may be provided to the computer program 40 in a real-time download sequence provided by a network connected server device, etc., according to an example.

Figure 11:
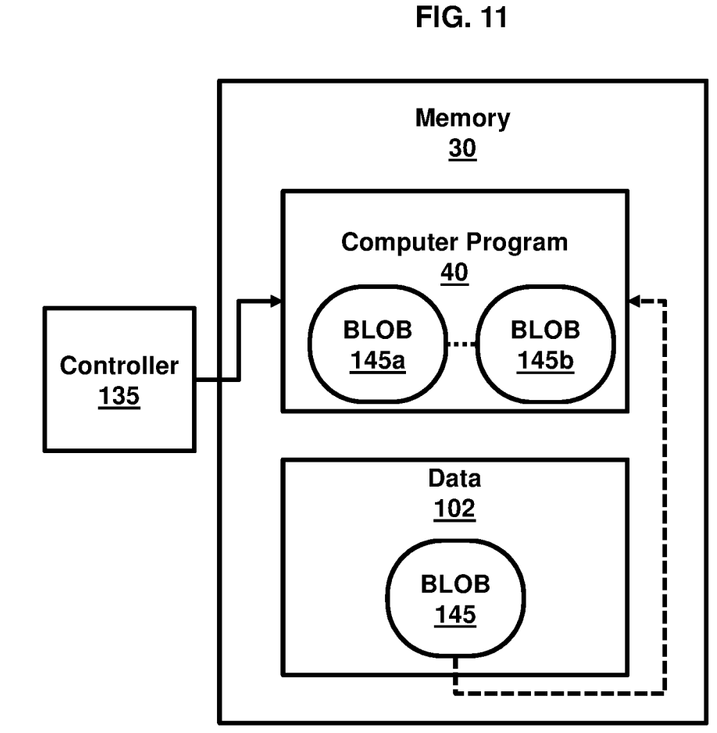
FIG. 11 is a block diagram illustrating that the set of data of the computer system of FIG. 7 includes a binary large object, according to an example.

FIG. 11, with reference to FIGS. 1 through 10, indicates that the set of data 102 may comprise a binary large object (BLOB) 145. In an example, the computer program 40 may provide an original version of the BLOB 145a for execution by the controller 135. In another example, the computer program 40 may provide a modified version of the BLOB 145b for execution by the controller 135. In still another example, the computer program 40 may provide a combination thereof; e.g., a combination of the original version of the BLOB 145a and the modified version of the BLOB 145b, for execution by the controller 135. The BLOB 145, original version of the BLOB 145a, modified version of the BLOB 145b, or a combination thereof may contain a set of binary data that is executable by the controller 135.

Figure 12:
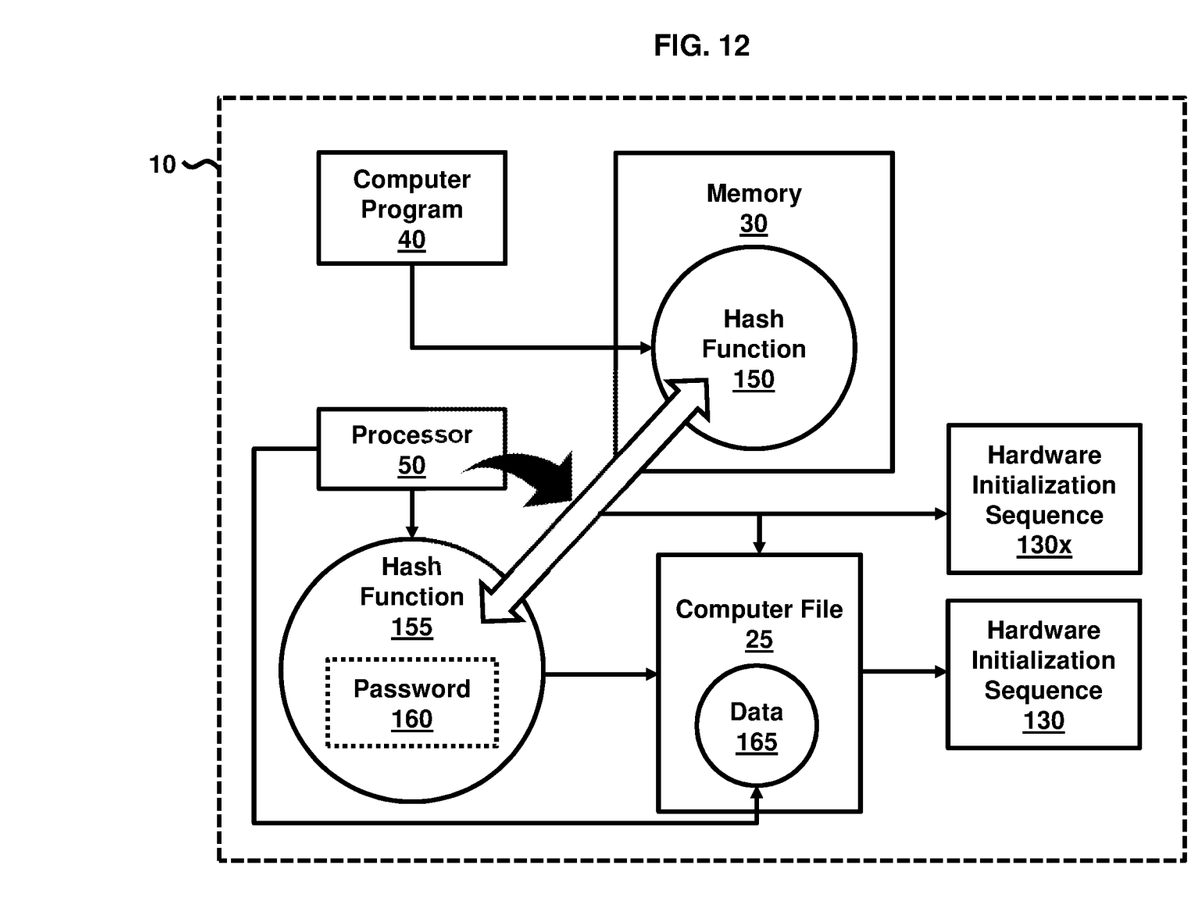
FIG. 12 is a block diagram illustrating a computing device to establish a trusted hardware initialization sequence to validate an exchange of data, according to an example.

Another example of the computing device 10 is provided in FIG. 12, with reference to FIGS. 1 through 11. The computing device 10 comprises memory 30 and processor 50, as described above with reference to FIGS. 1 through 12. In an example, the memory 30 stores a cryptographic hash function 150, which may be analogous to the cryptographic first hash 20 described above, associated with a computer program 40 executed by the computing device 10. The processor 50 establishes another cryptographic hash function 155, which may be analogous to the cryptographic second hash 35 described above containing a password 160 for a computer file 25. The password 160 may be analogous to the password 75 and code 105 described above. The processor 50 selects the cryptographic hash function 155 when the computer file 25 is to be executed during a hardware initialization sequence 130 carried out by the computing device 10. Next, the processor 50 links the cryptographic hash function 155 with the previously stored cryptographic hash function 150, where the linking is to establish a trusted hardware initialization sequence 130x for execution by the computing device 10. In this regard, the trusted hardware initialization sequence 130x may be the same as the hardware initialization sequence 130 once the processor 50 compares the cryptographic hash function 155 with the previously stored cryptographic hash function 150 and determines there is a match, and thus the hardware initialization sequence 130 may be trusted by the computing device 10. For ease of description and illustration, the trusted hardware initialization sequence 130x is shown in FIG. 12 as a separate component from the hardware initialization sequence 130. However, as described above it is the same as the hardware initialization sequence 130 except it is designated as being trusted upon the linking and matching of the cryptographic hash function 155 with the previously stored cryptographic hash function 150. Thereafter, in an example, the processor 50 validates data 165 exchanged between the computer file 25 and the computing device 10 during the hardware initialization sequence 130 based on the linking of the cryptographic hash function 155 with the previously stored cryptographic hash function 150.

Various examples described herein may include both hardware and software elements. The examples that are implemented in software may include firmware, resident software, microcode, etc. Other examples may include a computer program product configured to include a pre-configured set of instructions, which when performed, may result in actions as stated in conjunction with the methods described above. In an example, the preconfigured set of instructions may be stored on a tangible non-transitory computer readable medium or a program storage device containing software code.

Figure 13:
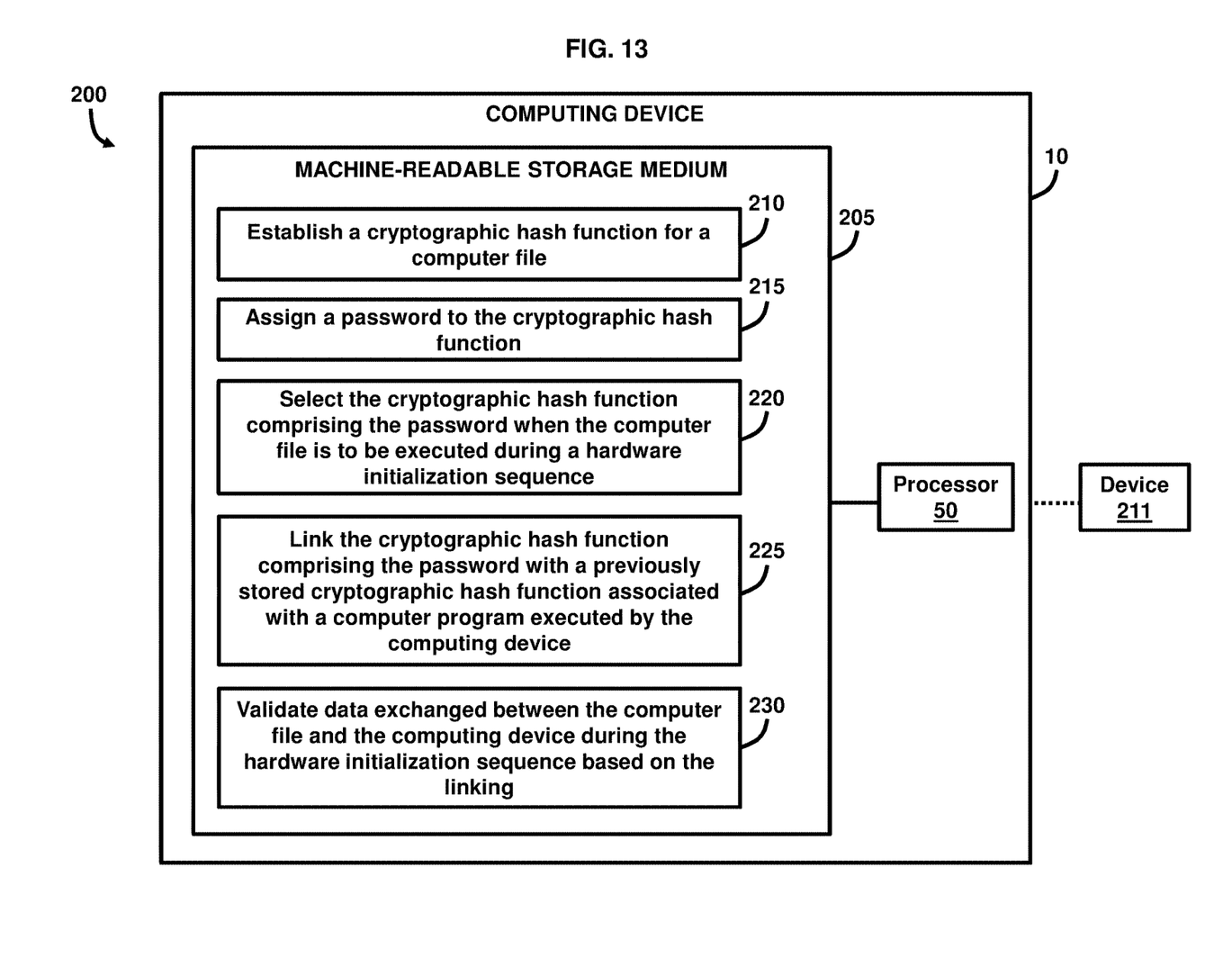
FIG. 13 is a block diagram illustrating a system to validate an exchange of data between a computer file and the computing device of FIG. 12, according to an example.

FIG. 13, with reference to FIGS. 1 through 12, illustrates an example system 200 to validate data 165. In the example of FIG. 13, the computing device 10 includes the processor 50 and a machine-readable storage medium 205. Processor 50 may include a central processing unit, microprocessors, hardware engines, and/or other hardware devices suitable for retrieval and execution of instructions stored in a machine-readable storage medium 205. Processor 50 may fetch, decode, and execute computer-executable instructions 210, 215, 220, 225, and 230 to enable execution of locally-hosted or remotely-hosted applications for controlling action of the computing device 10. The remotely-hosted applications may be accessible on one or more remotely-located devices; for example, device 211. For example, the device 211 may be a computer, tablet, smartphone, or remote server. As an alternative or in addition to retrieving and executing instructions, processor 50 may include one or more electronic circuits including a number of electronic components for performing the functionality of one or more of the instructions 210, 215, 220, 225, and 230.

The machine-readable storage medium 205 may be any electronic, magnetic, optical, or other physical storage device that stores executable instructions. Thus, the machine-readable storage medium 205 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the machine-readable storage medium 205 may include a non-transitory computer-readable storage medium. The machine-readable storage medium 205 may be encoded with executable instructions for enabling execution of remotely-hosted applications accessed on the one or more remotely-located devices 211.

In an example, the processor 50 of the computing device 10 executes the computer-executable instructions 210, 215, 220, 225, and 230. For example, establishing instructions 210 may establish a cryptographic hash function 155 for a computer file 25. Assigning instructions 215 may assign a password 160 to the cryptographic hash function 155. In an example, the password 160 may be randomly generated and assigned to the cryptographic hash function 155. Selecting instructions 220 may select the cryptographic hash function 155 comprising the password 160 when the computer file 25 is to be executed during a hardware initialization sequence 130.

Linking instructions 225 may link the cryptographic hash function 155 comprising the password 160 with a previously stored cryptographic hash function 150 associated with a computer program 40 executed by the computing device 10, where the linking is to establish a trusted hardware initialization sequence 130x for execution by the computing device 10. Validating instructions 230 may validate data 165 exchanged between the computer file 25 and the computing device 10 during the hardware initialization sequence 130 based on the linking.

In an example, the computer-executable instructions 210, 215, 220, 225, and 230, when executed, may further cause the processor 50 to determine whether to enable the computer program 40 to operate on the computing device 10 based on a comparison of the cryptographic hash function 155 with the previously stored cryptographic hash function 150. As such, the comparison of the cryptographic hash function 155 with the previously stored cryptographic hash function 150 helps in the validation; e.g. using the validating instructions 230, of the data 165 that is to be exchanged between the computer file 25 and the computing device 10 during the hardware initialization sequence 130. In an example, the computer-executable instructions 210, 215, 220, 225, and 230, when executed, may further cause the processor 50 to accept a request by the computer program 40 to operate upon the cryptographic hash function 155 matching the previously stored cryptographic hash function 150, which results in the validation; e.g. using the validating instructions 230, of the data 165. In another example, the computer-executable instructions 210, 215, 220, 225, and 230, when executed, may further cause the processor 50 to reject a request by the computer program 40 to operate upon the cryptographic hash function 155 not matching the previously stored cryptographic hash function 150, which results in non-validation of the data 165.

The techniques described by the examples above provide a mechanism to validate data 165 to be executed by a computing device 10 and/or an electronic device 115. In accordance with the examples above, there exists a boot initialization sequence such as boot sequence 55 or hardware initialization sequence 130, which is capable of receiving a BLOB 145 of bytes of data 102 from a trusted software application; e.g., trusted application computing agent 125, running in the operating system 45 of a computing device 10 and/or electronic device 115. In particular, this BLOB 145 contains sensitive information that the trusted application computing agent 125 wants to store securely. The trusted application computing agent 125 can retrieve the BLOB 145 from the boot sequence 55 or hardware initialization sequence 130 when it needs it, on demand.

The computing device 10 or computer system 100 has the necessary available hardware such as a circuit chip 15 or a trusted platform module device 120, respectively. The trusted application computing agent 125 is capable of communicating with the circuit chip 15 or the trusted platform module device 120. The trusted platform module device 120 is capable of calculating cryptographic hashes; e.g., first hash 20 or cryptographic hash function 155, for a BLOB 145, and the trusted platform module device 120 is also capable of storing data 102 on a firmware-protected memory 65 or an internal non-volatile memory 140. The trusted platform module device 120 allows for the defining of read and write credentials to a particular slot 141 on its non-volatile memory 140, for example. According to an example, the trusted application computing agent 125 may be a software agent that enforces security policies 70 or trusted security guidelines 110 described in a manifest file. The manifest file is the BLOB 145 that the boot sequence 55 or hardware initialization sequence 130 stores securely.

An example method to store the BLOB on the boot sequence 55 or hardware initialization sequence 130 is as follows. Initially, during the provisioning; i.e., during an installation process 90, of the trusted application computing agent 125 in the computing device 10 or electronic device 115, the trusted application computing agent 125 generates a random number; e.g., password 75 or code 105. Next, the trusted application computing agent 125 sends the password 75 or code 105 to the boot sequence 55 or hardware initialization sequence 130, which stores the password 75 or code 105 securely on its internal memory such as the firmware-protected memory 65 or non-volatile memory 140. Then, the trusted application computing agent 125 has a BLOB 145 that must be stored on the boot sequence 55 or hardware initialization sequence 130. The trusted application computing agent 125, when installed during an installation process 90, for example, has the initial/original version of the BLOB 145a on its installation folder. That initial/original version of the BLOB 145a is signed; i.e., the trusted application computing agent 125 knows its cryptographic hash; e.g., the second hash 20 or cryptographic hash function 150.

Thereafter, the trusted application computing agent 125 allows a user 80 to modify the information of the BLOB 145 to create a modified version of the BLOB 145b. In particular, if the BLOB 145 represents a configuration file with security policies 70 or trusted security guidelines 110, the user 80 can modify it by choosing the policies he/she wants to apply on the computing device 10 or electronic device 115. In any case, the trusted application computing agent 125 will send either the original version of the BLOB 145a or the modified version of the BLOB 145b to the boot sequence 55 or hardware initialization sequence 130. However, before sending the original version of the BLOB 145a, modified version of the BLOB 145b, or a combination thereof (hereinafter referred to as BLOB 145) to the boot sequence 55 or hardware initialization sequence 130, the trusted application computing agent 125 requests the trusted platform module device 120 to compute a cryptographic hash; e.g., first hash 20 or cryptographic hash function 155, of the BLOB 145. After this, the trusted application computing agent 125 stores the first hash 20 or cryptographic hash function 155 of the BLOB 145 on the non-volatile memory 140 of the trusted platform module device 120, setting as write privilege of that slot 141 the password 75 or code 105 created earlier. Thereafter, the trusted application computing agent 125 sends the BLOB 145 to the boot sequence 55 or hardware initialization sequence 130.

The method to retrieve the BLOB 145 from the boot sequence 55 or hardware initialization sequence 130 is as follows. The trusted application computing agent 125 makes a request to the boot sequence 55 or hardware initialization sequence 130 in order to retrieve the BLOB 145. Next, the boot sequence 55 or hardware initialization sequence 130 sends to the trusted application computing agent 125 the BLOB 145 it has stored on its internal memory; e.g., firmware-protected memory 65 or non-volatile memory 140. After this, the trusted application computing agent 125 requests the trusted platform module device 120 to calculate the first hash 20 or cryptographic hash function 155 of the BLOB 145 it just received from the boot sequence 55 or hardware initialization sequence 130.

Then, the trusted application computing agent 125 compares the second hash 35 or cryptographic hash function 150 calculated previously with the first hash 20 or cryptographic hash function 155 stored on the non-volatile memory 140 of the trusted platform module device 120. If the hashes; e.g., first hash 20 and second hash 35 or cryptographic hash function 150 and cryptographic hash function 155, are the same, the trusted application computing agent 125 accepts the BLOB 145 that was received. However, if the hashes; e.g., first hash 20 and second hash 35 or cryptographic hash function 150 and cryptographic hash function 155, are different, then the trusted application computing agent 125 refuses the BLOB 145 and destroys it. In case the hashes; e.g., first hash 20 and second hash 35 or cryptographic hash function 150 and cryptographic hash function 155, do not match, the trusted application computing agent 125 will use as current, a BLOB that it has previously stored; e.g., on a disk, etc. In an example, the BLOB 145 may represent a configuration manifest file. The manifest file stored on the boot sequence 55 or hardware initialization sequence 130 contains the previous selection of security policies 70 or trusted security guidelines 110 for a particular computing device 10 or electronic device 115. If the hash of the manifest file cannot be trusted, the selected configuration policies are reset to default; e.g., the ones described in the manifest on a disk, etc.

The techniques provide by the examples described above ensures that any BLOB 145 exchanged between a trusted application computing agent 125 and the boot sequence 55 or hardware initialization sequence 130 is not modified by malicious software. The system performance overhead is negligible using the techniques provided by the examples above, and results in an increase in the confidence on the boot sequence 55 or hardware initialization sequence 130 being the root of trust for trusted application computing agents 125 running on the operating system 45.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A computing device comprising:
   a circuit chip to compute a password protected first hash for a computer file;
   a memory coupled to the circuit chip to store a second hash associated with a computer program executed by an operating system of the computing device, wherein the second hash is created prior to the first hash; and
   a processor to initiate a single firmware boot sequence, wherein the processor is to:
   retrieve the password protected first hash when the computer file is to be executed by the processor during the single firmware boot sequence without a prior boot authentication occurring during the single firmware boot sequence;

compare the first hash with the second hash to establish whether the single firmware boot sequence is trusted for execution by the computing device; and execute the single firmware boot sequence when the first hash matches the second hash, wherein the firmware boot sequence is to receive firmware boot sequence-enforced security policy data from the computer program for storage in a firmware-protected memory and retrieval by the computer program from the firmware-protected memory on demand in a real-time download sequence provided by a network connected device.

2. The computing device of claim 1, wherein the circuit chip is communicatively linked to the computer program.

3. The computing device of claim 1, wherein the computer file comprises the firmware boot sequence-enforced security policy data, and wherein the computer program is to enforce security policies provided by the firmware boot sequence-enforced security policy data.

4. The computing device of claim 1, wherein the password of the first hash is randomly generated during an installation process of the computer program onto the computing device.

5. The computing device of claim 4, wherein a separate password of the first hash is randomly generated during a different installation process of the computer program onto the computing device.

6. The computing device of claim 1, wherein the password of the first hash is provided by any of a user and a remote network application during an installation process of the computer program onto the computing device.

7. The computing device of claim 1, wherein the circuit chip is to store the first hash in a first storage location, and wherein the memory is in a second storage location that is a separate location from the first storage location.

8. A computer system comprising:

a memory comprising a computer program, a set of data containing a cryptographic first hash protected by a code, and a set of trusted security guidelines for operating an electronic device, wherein the set of trusted security guidelines comprises hardware initialization-enforced security policy data associated with an operational security of the electronic device;

a trusted platform module device to store a cryptographic second hash associated with the computer program, wherein the cryptographic second hash is created prior to the cryptographic first hash, and wherein the computer program is to receive the hardware initialization-enforced security policy data in a real-time download sequence provided by a network connected device;

a processor to initiate a single hardware initialization sequence;

a trusted application computing agent to establish, during the single hardware initialization sequence, that the single hardware initialization sequence of the electronic device is trusted upon matching the first hash with the second hash and without a prior boot authentication occurring during the single hardware initialization sequence; and a controller to operate the computer program on the electronic device according to the set of trusted security guidelines.

9. The computer system of claim 8, wherein the trusted platform module device comprises a non-volatile memory, and wherein the computer program is to store the cryptographic first hash for the set of data in the non-volatile memory.

10. The computer system of claim 9, wherein the code is to protect a programmable storage slot in the non-volatile memory.

11. The computer system of claim 9, wherein trusted platform module device is to define read and write credentials to the programmable storage slot in the non-volatile memory.

12. The computer system of claim 8, wherein the set of data comprises a binary large object (BLOB), and wherein the computer program is to provide an original version of the BLOB, a modified version of the BLOB, or a combination thereof, for execution by the controller.

13. A non-transitory machine-readable storage medium comprising computer-executable instructions that when executed cause a processor of a computing device to:

establish a set of trusted security guidelines for operating the computing device, wherein the set of trusted security guidelines comprises hardware initialization-enforced security policy data associated with an operational security of the computing device;

establish a cryptographic hash function for a computer file;

assign a password to the cryptographic hash function;

select the cryptographic hash function comprising the password when the computer file is to be executed during a single hardware initialization sequence;

link, during the single hardware initialization sequence, the cryptographic hash function comprising the password with a previously stored cryptographic hash function associated with a computer program executed by the computing device, wherein the linking is to establish that the single hardware initialization sequence is trusted for execution by the computing device without a prior boot authentication occurring during the single hardware initialization sequence, and wherein the computer program is to receive the hardware initialization-enforced security policy data in a real-time download sequence provided by a network connected device; and validate data exchanged between the computer file and the computing device during the single hardware initialization sequence based on the linking.

14. The non-transitory machine-readable storage medium of claim 13, wherein the instructions, when executed, further cause the processor to determine whether to enable the computer program to operate on the computing device based on a comparison of the cryptographic hash function with the previously stored cryptographic hash function.

15. The non-transitory machine-readable storage medium of claim 14, wherein the instructions, when executed, further cause the processor to accept a request by the computer program to operate upon the cryptographic hash function matching the previously stored cryptographic hash function.

16. The non-transitory machine-readable storage medium of claim 14, wherein the instructions, when executed, further cause the processor to reject a request by the computer program to operate upon the cryptographic hash function not matching the previously stored cryptographic hash function.

17. The non-transitory machine-readable storage medium of claim 14, wherein the instructions, when executed, further cause the processor to perform the single hardware initialization sequence, and wherein the single hardware initialization sequence comprises a basic input/output system (BIOS) or a Unified Extensible Firmware Interface (UEFI) initialization sequence.

* * * * *